Sept. 20, 1938.  E. G. MUELLER  2,130,595
BRAKE HEAD BALANCING DEVICE
Filed Aug. 20, 1936  2 Sheets-Sheet 1
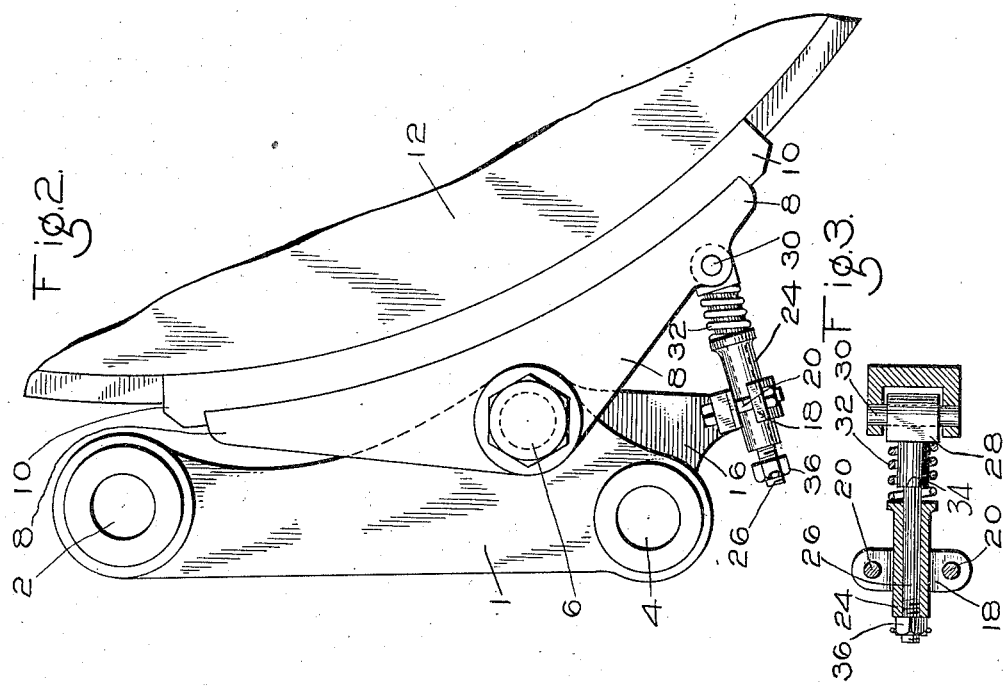
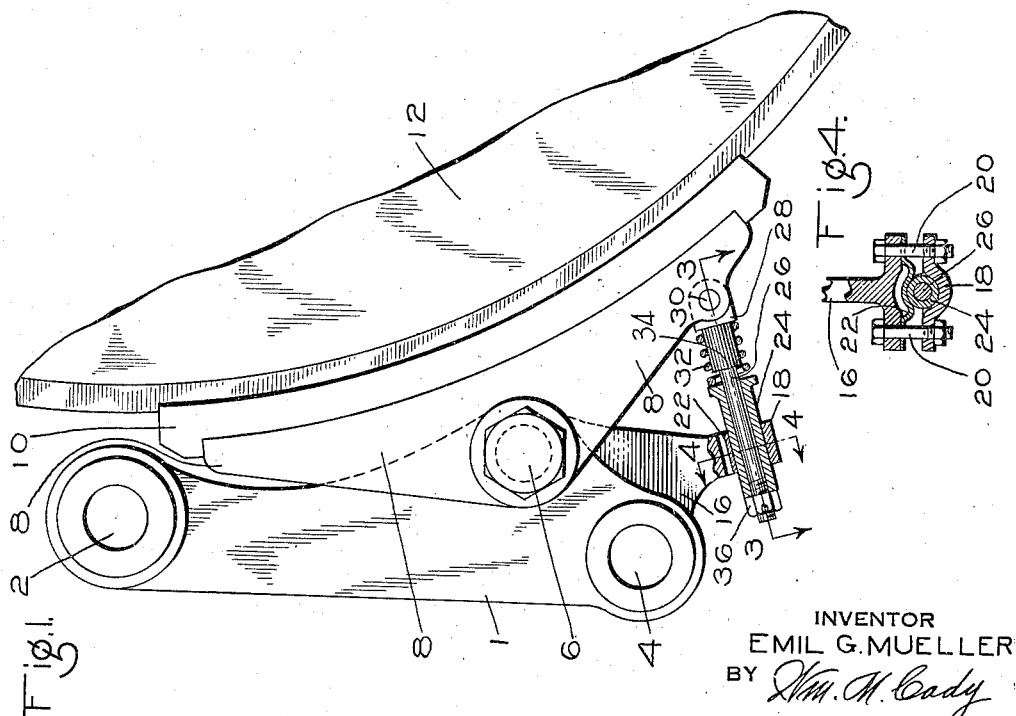
INVENTOR
EMIL G. MUELLER
BY *Wm. M. Cady*
ATTORNEY Sept. 20, 1938. E. G. MUELLER 2,130,595
BRAKE HEAD BALANCING DEVICE
Filed Aug. 20, 1936 2 Sheets-Sheet 2
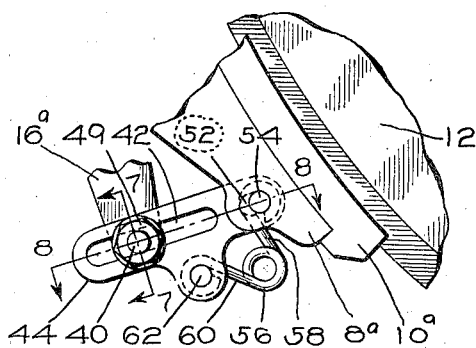
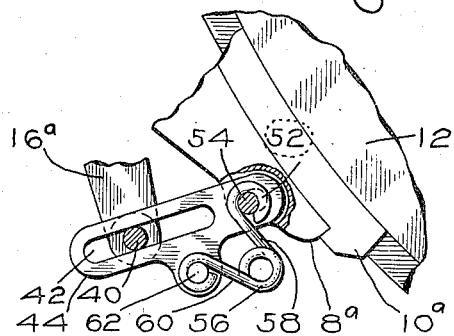
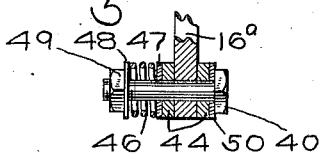
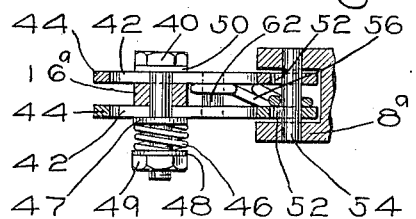
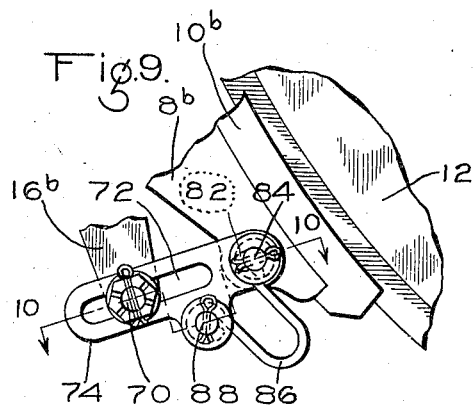
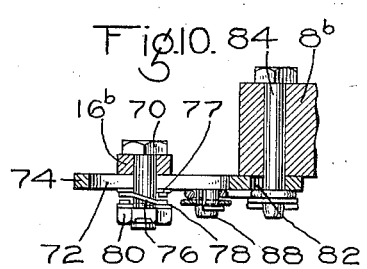
INVENTOR
EMIL G. MUELLER
BY *Wm. M. Cady*
ATTORNEY Patented Sept. 20, 1938

2,130,595

UNITED STATES PATENT OFFICE 2,130,595

BRAKE HEAD BALANCING DEVICE

Emil G. Mueller, Swissvale, Pa., assignor to The American Brake Company, Swissvale, Pa., a corporation of Missouri Application August 20, 1936, Serial No. 96,953

17 Claims. (Cl. 188—230)

This invention relates to brake heads and brake hangers, and has for its object to provide improved connecting means whereby the brake head will be automatically adjusted upon its pivot so that the shoe may be maintained in a position substantially concentric of the wheel when the brake hanger is in the release position.

In some brake equipments hangers are provided which are pivotally secured to the vehicle structure, and extend downwardly adjacent a wheel of the vehicle. The brake hanger has secured thereto at a point vertically below the horizontal plane of the axis of the wheel, a brake head which carries a brake shoe which is adapted to engage the rim of the wheel. In these installations the brake head has been loosely pivoted on the brake hanger, and when the brakes are released the weight of the shoe and head causes them to pivot on the brake hanger so that the upper end of the shoe engages the rim of the wheel. This has resulted in the top of the brake shoe being worn off, heating of the wheel rim during release of the brakes, and producing a reduction in the shoe area with consequent higher unit pressure on the shoe when the brakes are applied.

It is an object of this invention to provide means to maintain the top of the shoe out of contact with the rim of the wheel while the brakes are released.

A further object of the invention is to provide a brake head balancing device which will hold the brake shoes substantially concentric of the wheel when the brakes are released.

Another object of the invention is to provide brake head balancing means of the type described, and incorporating adjusting means by which the position in which the brake shoe is held during the release of the brakes may be adjustably varied.

A further object of the invention is to provide improved brake head balancing means which is automatically adjustable on wear of the brake shoe carried by the brake head, so that on adjustment of the brake rigging to remove the slack therein, and thus change the angular position of the brake hanger on the release of the brakes, the brake shoe is maintained substantially concentric of the wheel.

Another object of the invention is to provide improved brake head balancing means which operates on the release of the brakes following an application to permit the brake hanger to move only a predetermined amount relative to the brake head from the position which is occupied relative to the brake head while the brakes were applied.

A further object of my invention is to provide yielding means associated with the brake head to hold the lower portion of the brake head and the brake shoe against movement away from the wheel on the release of the brakes until the brake head has been moved a predetermined distance, so as to insure that the top of the brake shoe will amply clear the wheel when the brake hanger is in the release position, together with means for automatically maintaining the extent of this movement uniform against changes resulting from wear of the brake shoe.

Another object of the invention is to provide an improved brake head balancing device.

Other objects of the invention and features of novelty will be apparent from the following description taken in connection with the accompanying drawings, in which, Fig. 1 is an elevational view of a portion of a brake equipment embodying my invention, parts of the equipment being broken away and shown in section in order to more clearly reveal other parts, the equipment being shown in the release position, Fig. 2 is a view similar to Fig. 1, but showing the equipment in the application position, Fig. 3 is a sectional view taken substantially along the line 3—3 of Fig. 1, Fig. 4 is a sectional view taken substantially along the line 4—4 of Fig. 1, Fig. 5 is a fragmentary view of another brake equipment embodying a modified form of my invention, the equipment being shown in the release position, Fig. 6 is a view similar to Fig. 5, but showing the equipment in the application position, Fig. 7 is a sectional view taken substantially along the line 7—7 of Fig. 5, Fig. 8 is a sectional view taken substantially along the line 8—8 of Fig. 5, Fig. 9 is a fragmentary view of another brake equipment embodying a still different form of my invention, the equipment being shown in the release position, and Fig. 10 is a sectional view taken substantially along the line 10—10 of Fig. 9.

Referring to the drawings, the brake equipment shown in Figs. 1 to 4 thereof comprises a brake hanger 1, which is pivotally secured adjacent its upper end to a portion of the vehicle structure, not shown, by means of a pin, not shown, which extends through a hole 2. The brake hanger 1 is adapted to have secured thereto at a point adjacent the lower end thereof, a brake applying member, not shown, which extends through an opening 4.

The brake hanger 1 has pivotally supported thereon adjacent the lower end thereof by means of a pin 6, a brake head 8, which carries a shoe 10, which is adapted to engage the rim of a wheel 12 of the vehicle in a zone vertically below the horizontal plane of the axis of the wheel.

The brake hanger 1 has formed integral therewith a bracket 16, which projects from the lower end of the brake hanger. A clamp 18 is secured to the bracket 16 by means of bolts 20, while a resilient member 22 is mounted on the bolts 20 between the clamp 18 and the bracket member 16. The clamp 18 and the member 22 have confronting grooves therein which are adapted to receive a tubular sleeve 24. The central portion of the resilient member 22 is spaced from the face of the bracket 16 a short distance, as is best shown in Fig. 4 of the drawings.

The sleeve 24 has a bore therein through which extends a link 26 having a head 28, which is pivotally connected to the lower end of a brake head 8 by means of a pin 30.

A spring 32 is mounted on the link 26 between the sleeve 24 and the head 28, and yieldingly urges the link 26 and the lower end of the brake head 8 to the right, as viewed in Figs. 1 and 2 of the drawings. The head 28 has a shoulder 34 thereon within the spring 32 which is adapted to be engaged by the end of the sleeve 24 at certain times, as will hereinafter more fully appear. Movement of the link 26 and the lower end of the brake head 8 by the spring 32 is limited by engagement of a nut 36, adjustably secured on the threaded end of the stem 26, with the end of the tubular sleeve 24.

The clamp 18 is drawn towards the bracket 16 by the bolts 20 so as to press the sleeve 24 against the resilient member 22 firmly enough to prevent unintended movement of the sleeve 24 relative to the bracket 16, but so as to permit the bracket to be moved readily relative to the sleeve when the brake hanger and brake head are moved relative to each other beyond a predetermined range of movement, as will hereinafter more fully appear.

This brake head balancing means is initially adjusted when the brakes are applied as shown in Fig. 2 of the drawings. With the brake shoe 10 pressed against the rim of the wheel 12 by the brake hanger 1 the sleeve 24 is adjusted relative to the bracket 16 so that the end of the sleeve engages the shoulder 34 on the head 28 of the link 26.

The brakes are now released so that the brake hanger 1 is moved to the position in which it is shown in Fig. 1 of the drawings. When the brakes are released the spring 32 expands and urges the lower end of the brake head 8 away from the bracket 16 until further movement of the brake head is prevented by engagement of the nut 36 with the end of the sleeve 24. The nut 36 is adjusted on the link 26 so that when the brake hanger 1 is in the release position, the brake head 8 is held in a position in which the upper and lower ends of the brake shoe are substantially equal distances from the rim of the wheel 12.

The various parts of the brake equipment are arranged and proportioned so that when the nut 36 is in engagement with the end of the sleeve 24, the spring 32 will be under substantial compression so as to prevent unintended movement of the brake head 8 about the pin 6 carried by the brake hanger 1.

On an application of the brakes, the brake applying member, which is secured in the opening 4 in the brake hanger 1, exerts force on the brake hanger 1 to move it in a counterclockwise direction, as viewed in Figs. 1 and 2 of the drawings, about the pin on which it is mounted to thereby move the brake head 8 and the brake shoe 10 to the right to press the brake shoe 10 against the rim of the wheel 12.

On this movement of the brake hanger 1, the lower end of the brake shoe 10, being farthest removed from the axis about which the brake hanger moves, engages the rim of the wheel 12 first, and on further movement of the brake hanger 1, the brake head 8 pivots on the pin 6 until the upper portion of the brake shoe 10 engages the rim of the wheel 12 so that the entire face of the brake shoe 10 is pressed against the wheel rim.

On this movement of the brake hanger relative to the brake head, the spring 32 is compressed and the end of the sleeve 24 is moved toward the shoulder 34 on the link 26. The amount of movement permitted the sleeve 24 before the end thereof engages the shoulder 34 depends upon the adjustment of the nut 36.

On the subsequent release of the brakes, the lower end of the brake hanger 1 moves to the left, as viewed in Fig. 2 of the drawings, thereby moving the brake head 8 and the brake shoe 10 away from the rim of the wheel 12, while the spring 32 will expand so as to maintain the lower end of the brake shoe 10 in engagement with the wheel rim so that the brake head pivots on the pin 6 relative to the brake hanger.

On this movement of the brake hanger 1 relative to the brake head 8, the upper end of the brake shoe 10 is moved away from the rim of the wheel 12. When the brake hanger 1 is moved a part of the distance towards the release position, further movement of the brake hanger relative to the brake head is prevented by engagement of the end of the sleeve 24 with the nut 36 on the link 26. However, as the result of this amount of movement of the brake hanger, the upper end of the brake shoe 10 is moved a predetermined distance away from the wheel rim so that it will not engage the wheel rim when the brakes are released.

On further movement of the brake hanger towards the release position, the brake head is moved with the brake hanger, the lower portion of the brake shoe as well as the upper portion thereof being moved away from the wheel rim.

As the brake head 8 is held by the spring 32 when the brakes are released, it will not pivot about the pin 6 so as to move the upper end of the shoe into engagement with the rim of the wheel 12, and as a result the upper end of the brake shoe 10 will not rub against the rim of the wheel 12.

As a result of repeated application of the brakes, the brake shoe 10 is gradually worn away, and the brake hanger 1 must be progressively moved farther towards the wheel 12 to press the brake shoe 10 against the rim of the wheel. The lower end of the brake shoe 10, being most distant from the axis about which the brake hanger 1 moves, is moved farther than the upper end of the brake shoe, which is least distant from the axis about which the brake hanger moves, and the difference in the extent of movement of the lower and upper ends of the brake shoe increases as the amount of movement of the brake hanger is increased.

Because of this increase in the difference between the extent of movement of the lower and upper ends of the brake shoe in effecting an application of the brakes, the brake hanger 1 and the brake head 8 are moved relative to each other somewhat farther than before, the lower end of the brake hanger and of the brake head being moved closer together.

On this greater relative movement of the brake hanger 1 and the brake head 8, the end of the sleeve 24 is moved into engagement with the shoulder 34 on the link 26 before the brake shoe 10 fully engages the wheel 12, so that further movement of the brake hanger 1 towards the application position, and consequent further relative movement between the brake hanger 1 and the brake head 8, causes a movement of the bracket 16 and of the clamp 18 relative to the sleeve 24. This movement of the bracket and clamp is permitted as the sleeve 24 is yieldingly clamped between the resilient member 22 and the clamp 18.

After movement of the bracket 16 relative to the sleeve 24 as a result of relative movement of the brake hanger 1 and the brake head 8, the sleeve is held in this position by the resilient member 22.

On the subsequent release of the brakes, the spring 32 expands and maintains the lower end of the brake shoe 10 in engagement with the wheel rim until the brake hanger 1 is moved relative to the brake head 8 a predetermined amount, as explained above. After movement of the brake hanger 1 a part of the distance towards the release position the end of the sleeve 24 is moved into engagement with the nut 36 so as to prevent further relative movement between the brake hanger and the brake head.

On further movement of the brake hanger 1 towards the release position, the brake head 8 is moved with the brake hanger so that the lower end of the brake shoe 10 as well as the upper end thereof is moved away from the rim of the wheel 12.

The amount of movement of the brake hanger 1 relative to the brake head 8 may be adjustably varied by varying the position of the nut 36 on the link 26, and in this way the position in which the brake head 8 is held while the brakes are released may be adjustably controlled.

This process is repeated on each application of the brakes, and as the brake shoe wears, the bracket 16 is gradually moved farther to the right, as viewed in Figs. 1 to 3 of the drawings, relative to the sleeve 24, so that the position in which the lower end of the brake shoe is held by the nut 36 is progressively moved closer to the bracket 16 on the brake hanger 1.

This results in the lower end of the brake shoe 10 being held farther from the rim of the wheel 12, and the upper end of the shoe being held somewhat closer to the wheel, but the brake head is held in a position such that the upper end of the shoe is spaced from the wheel rim.

After the brake shoe 10 has been worn a certain amount, the adjusting means, not shown, incorporated in the brake rigging is adjusted to remove the slack which has developed in the brake rigging as a result of wear of the brake shoes. This adjustment of the brake rigging causes the lower end of the brake hanger to be moved to the right from the position in which it is shown in Fig. 1 of the drawings. As a result of this movement of the brake hanger 1, the brake shoe 10 is moved towards the wheel 12. The lower end of the brake shoe, being farther removed from the axis about which the brake hanger pivots, is moved farther towards the wheel 12 than the upper portion of the brake shoe so that the brake shoe is again substantially concentric of the wheel 12 when the brake hanger is in its release position, as determined by the brake rigging after the slack has been removed therefrom.

If the lower end of the brake head 8 were always held the same distance from the bracket 16 on the brake hanger 1 while the brakes are released, then when the slack is removed from the brake rigging and the brake hanger moved towards the wheel, as the lower end of the brake shoe is moved farther than the other portions of the brake shoe, it might be moved into engagement with the rim of the wheel and held in engagement therewith while the brakes are released.

However, as the position in which the lower end of the brake head is held relative to the brake hanger 1 is gradually moved closer to the bracket 16 as the brake shoe wears, there is no possibility that the lower end of the brake shoe will be moved into engagement with the wheel when the slack is removed from the brake rigging.

On subsequent applications of the brakes, and on further wear of the brake shoe 10, the brake hanger 1 and the brake head 8 are moved relative to each other so that the end of the sleeve 24 presses against the shoulder 34 on the link 26 so that the bracket 16 is moved to the right relative to the sleeve 24 as explained above, with the result that on the release of the brakes, movement of the brake hanger 1 relative to the brake head 8 is terminated before the bracket 16 is moved away from the lower end of the brake head 8 all of the distance to the position it formerly occupied.

However, as pointed out above, the amount of movement permitted the bracket 16 relative to the brake head 8 before the end of the sleeve 24 engages the nut 36 is such that the brake head 8 is held in a position in which the upper end of the brake shoe is spaced from the face of the wheel 12.

On subsequent adjustments of the brake rigging to take up the slack therein, the brake hanger 1 and brake shoe 10 are again moved closer to the wheel 12, and the shoe 10 is again substantially concentric of the wheel, as explained in detail above.

It will be seen that the brake head balancing means provided by this invention provides means to maintain the brake head in such a position relative to the brake hanger while the brakes are released that the upper portion of the brake shoe will not engage the wheel. It will be seen also that this brake head balancing means incorporates means operative on the release of the brakes after an application to permit the brake hanger to move only a predetermined distance relative to the brake head, so that on the release of the brakes, the brake head is maintained in a position in which the brake shoe does not engage the wheel.

In addition, it will be seen that as the brake shoe wears, the brake head balancing means provided by this invention is automatically adjusted to change the position in which the brake head is held so that when the slack is removed from the brake rigging, and the position in which the brake hanger is held on the release of the brakes is altered, the brake head will be held in a position relative to the brake hanger to maintain the brake shoe substantially concentric of the wheel so that no part of the brake shoe will rub on the wheel while the brakes are released.

In Figs. 5 to 8 of the drawings there is illustrated a portion of a brake equipment embodying a modified form of my invention, and in this brake equipment the brake hanger, not shown, has a bracket 16a formed integral therewith and projecting from the lower end thereof. This bracket has a hole in the lower end thereof in which is mounted a bolt 40, which also extends through slots 42 in member 44, which engage opposite faces of the bracket 16a.

The members 44 are yieldingly pressed against the faces of the bracket 16a by a spring 46 mounted on the bolt 40 between washers 47 and 48, one of which engages the face of a nut 49, and the other of which engages the face of one of the members 44. A washer 50 is interposed between the head of the bolt 40 and the face of the other of the members 44.

The members 44 have slots 52 therein adjacent their ends, and a pin 54 carried by the brake head 8a extends through these slots. A torsional spring 56 is provided, and it has one of its arms 58 secured on the pin 54, and has its other arm 60 secured on a pin 62 carried by the members 44. The spring 56 is designed so that when the arms 58 and 60 are secured on the pins 54 and 62 a substantial force is exerted on these pins tending to move them apart.

In service, when the brakes are released and the brake shoe 10a is out of engagement with the rim of the wheel 12, the spring 56 moves the pins 54 and 62 apart, the pin 54 being moved to the ends of the slots 52 in the members 44 as shown in Figs. 5 and 8 of the drawings.

The members 44 are adjustably secured relative to the bracket 16a, and are initially adjusted thereon so that when the brake hanger is in the application position and the brake shoe 10a is pressed against the rim of the wheel 12, as shown in Fig. 6 of the drawings, the left hand ends of the slots 52 in the members 44 engage the pin 54. When the members 44 have been properly adjusted relative to the bracket 16a, the nut 49 is tightened so that sufficient force is exerted by the spring 46 to press the members 44 against the faces of the bracket 16a so that there is enough resistance to movement of the members 44 to prevent unintended movement of these members relative to the bracket 16a by force transmitted to these members through the spring 56.

On an application of the brakes, the brake hanger, not shown, is moved in a direction to move the brake shoe 10a against the rim of the wheel 12.

On this movement of the brake hanger, the lower end of the brake shoe 10a, which is farthest removed from the axis about which the brake hanger turns, engages the wheel first, and on further movement of the brake hanger, the brake head 8a pivots on the pin on which it is mounted on the brake hanger, so that the entire face of the brake shoe 10a is pressed against the wheel rim, while the bracket 16a is moved closer to the lower end of the brake head 8a.

On this movement of the brake hanger relative to the brake head the members 44 are moved relative to the pin 54, while the spring 56 is compressed somewhat. In addition, on this movement of the bracket relative to the brake head 8a, the members 44 are turned slightly on the bolt 40.

On this movement of the members 44, force is exerted through the spring 56 upon the pin 62 opposing movement of this pin and the members 44 to the right, as viewed in Figs. 5 and 6 of the drawings. However, the spring 56 and the other parts of the apparatus are proportioned so that the force transmitted through the spring 56 to the members 44 is insufficient to prevent movement of these members by the bracket 16a.

On the subsequent release of the brakes, the brake hanger, not shown, and the bracket 16a are moved to the left, as viewed in Figs. 5 and 6 of the drawings, so as to move the brake head 8a and the brake shoe 10a away from the rim of the wheel 12. On this movement of the brake hanger, the spring 56 will expand somewhat so as to maintain the lower end of the brake shoe in engagement with the wheel until the members 44 have been moved far enough that the ends of the slots 52 in the members 44 engage the pin 54. After the members 44 have been moved this amount, further movement thereof relative to the pin 54 is prevented, and as a result of this amount of movement of the members 44, the brake hanger 1 will have been moved relative to the lower end of the brake head 8a to a position such that when the brake hanger is in its normal release position, the upper and lower ends of the brake shoe 10a are spaced substantially equal distances from the rim of the wheel 12.

The spring 56 will operate to prevent movement of the lower end of the brake shoe 10a away from the wheel 12 and corresponding movement of the upper end of the brake shoe into engagement with the rim of the wheel 12, and as a result, the upper end of the brake shoe 10a will not engage the rim of a wheel 12 while the brakes are released.

As a result of repeated applications of the brakes, the brake shoe 10a will be worn away so that in order to press the shoe against the wheel to effect an application of the brakes, the brake hanger, not shown, must be moved somewhat farther from the release position, and as a result of this greater movement of the brake hanger, there will be greater movement of the brake hanger and of the bracket 16a carried thereby relative to the brake head.

The relative movement between the bracket 16a and the brake head 8a is great enough after wear of the brake shoe 10a, that the left hand ends of the slots 52 in the members 44, as viewed in Figs. 5, 6 and 8 of the drawings, will be moved into engagement with the pin 54 carried by the brake head 8a before the shoe 10a fully engages the rim of the wheel 12, so that on further movement of the bracket 16a relative to the brake head, the ends of the slots 52 press against the pin 54 and cause the bracket 16a to be moved relative to the members 44. This movement of the bracket 16a is permitted as the members 44 are yieldingly held against the faces of the bracket 16a by the spring 46, which serves to hold the members 44 after movement of the bracket 16a.

On the subsequent release of the brakes, the brake hanger, not shown, and the bracket 16a are moved to the left, as viewed in Figs. 5, 6 and 8 of the drawings.

On initial movement of the brake hanger, the spring 56 expands and maintains the lower end of the brake shoe 10a in engagement with the wheel rim, while the upper end of the brake shoe is moved away from the rim of the wheel, the brake head pivoting on the pin on which it is mounted. On this movement of the brake hanger and of the bracket 16a relative to the brake head 8a, the members 44 are moved relative to the pin 54 carried by the brake head 8a. As the bracket 16a was previously moved relative to the members 44 on the application of the brakes, the right hand ends of the slots 52 in the members 44 will be moved into engagement with the pin 54 before the bracket 16a has been moved away from the lower end of the brake head 8a all of the distance to the position which it formerly occupied relative to the brake head. The bracket 16a is moved to a position such, however, that when the brake hanger is in its release position, the upper and lower ends of the brake shoe will be spaced from the wheel rim.

On further movement of the brake hanger towards its release position, the brake head is moved with the brake hanger so that the lower end of the brake shoe, as well as the upper end thereof, is moved away from the wheel rim.

This process is repeated on each application of the brakes, and as the brake shoe wears, the bracket 16a is gradually moved relative to the members 44 farther to the right, as viewed in Figs. 5, 6 and 8 of the drawings, so that the position in which the lower ends of the brake head 8a and of the brake shoe 10a are held on the release of the brakes is progressively moved closer to the bracket 16a.

After the brake shoe 10a has worn a certain amount the adjusting means, not shown, incorporated in the brake rigging is adjusted to remove the slack which is developed in the brake rigging as a result of the wear of the brake shoes. This adjustment of the brake rigging causes the brake hanger, not shown, to be moved towards the application position. As a result of this movement of the brake hanger, the brake shoe 10a is moved closer to the wheel 12, and the lower end of the brake shoe, being farthest removed from the axis about which the brake hanger pivots, is moved farther towards the wheel 12 than the upper portion of the brake shoe so that the shoe is again substantially concentric of the wheel 12 when the brake hanger is in its release position.

As pointed out above, if the lower portion of the brake shoe were always held the same distance from the bracket 16a on the brake hanger during the release of the brakes, then when the slack is removed from the brake rigging, as the lower end of the shoe is moved farther than the other portions of the brake shoe, the lower end of the shoe might be held in engagement with the wheel during the release of the brakes after adjustment of the brake rigging to remove the slack therefrom. However, as the position in which the lower end of the brake shoe is held by the members 44 is gradually moved closer to the bracket 16a as the brake shoe wears, there is no possibility that the lower end of the brake shoe will be pressed into engagement with the rim of the wheel while the brakes are released after the slack is removed from the brake rigging.

On subsequent applications of the brakes, and on further wear of the brake shoe 10a, the brake hanger is moved relative to the brake head so that the ends of the slots 52 in the members 44 engage the pin 54 and the bracket 16a is moved relative to these members, as explained in detail above, so that on the subsequent release of the brakes, movement of the bracket 16a away from the lower end of the brake shoe 10a is prevented before the bracket has been moved all of the distance to the position relative to the brake head which it formerly occupied.

In Figs. 9 and 10 of the drawings there is illustrated a portion of a brake equipment embodying a still different form of my invention. In this brake equipment, the brake hanger, not shown, is provided with a bracket 16b which projects from the lower end thereof. This bracket has a hole therein, in which is secured a bolt 70, which also extends through a slot 72 in a member 74, which is generally similar to one of the members 44 employed in the embodiment of the invention illustrated in Figs. 5 to 8 of the drawings.

The member 74 is yieldingly pressed against a face of the bracket 16b by means of a spring 76 mounted on the bolt 70 between washers 77 and 78, and this spring is compressed by means of a nut 80 carried by the bolt 70.

The member 74 has a slot 82 formed in the end thereof through which extends a pin 84 carried by the brake head 8b. A spring 86 is provided, which, as shown, comprises a substantially U-shaped piece of resilient wire having one arm thereof secured on the pin 84, and having its other arm secured on a pin 88 carried by the member 74. The spring 86 is designed so that when the arms thereof are secured on the pins 84 and 88, a substantial force is exerted on these pins tending to move them apart.

In service, the operation of this embodiment of the invention is substantially the same as that illustrated in Figs. 5 to 8 of the drawings. When the brakes are released, and the brake hanger, not shown, is in its normal release position so that the brake head 8b and the brake shoe 10b are out of engagement with the rim of the wheel 12, the spring 86 exerts force on the pin 84 to hold it in engagement with the right hand end of the slot 82 in the member 74, as viewed in Figs. 9 and 10 of the drawings.

The member 74 is adjustably secured relative to the bracket 16b carried by the brake hanger, and is initially adjusted thereon so that when the brake hanger, not shown, is in its application position and the brake shoe 10b is pressed against the rim of the wheel 12, the left hand end of the slot 82 in the member 74 is pressed against the pin 84. When the member 74 has been properly adjusted relative to the bracket 16b, the nut 80 is tightened so that sufficient force is exerted through the spring 76 to press the member 74 against the face of the bracket 16b firmly enough so that there is enough resistance to movement of the member 74 to prevent unintended movement thereof relative to the bracket 16b by force transmitted through the spring 86.

On an application of the brakes, the brake hanger, not shown, is moved in a direction to move the brake shoe 10b against the rim of the wheel 12. On this movement of the brake hanger, the lower end of the brake shoe 10b engages the face of the wheel rim first, and on further movement of the brake hanger, the brake head 8b pivots on the pin on which it is mounted, so that the entire face of the brake shoe is pressed against the wheel rim.

On this movement of the brake hanger relative to the brake head, the bracket 16b is moved towards the lower end of the brake head and moves the member 74 relative to the pin 84, while the spring 86 is compressed. In addition, on this movement of the brake hanger relative to the brake head, the member 74 is turned slightly on the bolt 70.

On this movement of the member 74, force is exerted through the spring 86 upon the pin 88 carried by the member 74 and opposing movement of this pin and the member 74 to the right, as viewed in Figs. 9 and 10 of the drawings. However, the spring 86 and the other parts of the apparatus are proportioned so that the force transmitted through the spring 86 to the member 74 is insufficient to prevent movement of this member by the bracket 16b.

On the subsequent release of the brakes, the brake hanger, not shown, is moved to the left, as viewed in Figs. 9 and 10 of the drawings, so as to move the brake head 8b and the brake shoe 10b away from the rim of the wheel 12. On this movement of the brake hanger, the spring 86 will expand and will maintain the lower end of the brake shoe in engagement with the rim of the wheel 12, while the member 74 is moved relative to the pin 84 until the right hand end of the slot 82 in the member 74 engages the pin 84 carried by the brake head 8b. By this movement of the brake hanger relative to the brake head, the lower end of the brake head 8b and the brake shoe 10b are held in a position such that when the brake hanger, not shown, is moved farther to the left and is in its normal release position, the upper and lower ends of the brake shoe 10b are spaced substantially equal distances from the rim of the wheel 12, while the lower end of the brake shoe 10b is prevented from moving to the left, as viewed in Fig. 9 of the drawings, so as to prevent movement of the upper end of the brake shoe into engagement with the rim of the wheel 12.

As a result of repeated applications of the brakes, the brake shoe 10b will be worn, so that on subsequent application of the brakes, the brake hanger is moved farther in effecting an application of the brakes and there is greater relative movement between the bracket 16b and the brake head 8b, as explained in detail in connection with the embodiment of the invention shown in Figs. 5 to 8 of the drawings.

Because of this greater relative movement between the brake head and the bracket 16b, the member 74 is moved to the position in which the end of the slot 82 engages the pin 84 before the shoe is completely pressed against the wheel so that on further relative movement of the bracket 16b and the brake head 8b, the bracket 16b is moved relative to the member 74, and the member 74 is thereafter held in this position by the spring 76.

On the subsequent release of the brakes movement of the bracket relative to the lower end of the brake head is prevented before the brake hanger is returned to the position relative to the brake head which it formerly occupied, substantially as described in detail in connection with the embodiment of the invention shown in Figs. 5 to 8 of the drawings.

With each of the embodiments of the invention, when the brake shoe is replaced, the brake head balancing means is manually adjusted relative to the brake hanger while the brakes are applied, as explained above.

It will be seen that each of the brake head balancing means provided by my invention incorporates means operative on the release of the brakes to maintain the brake head in a position relative to the brake hanger so that the brake shoe will not engage the wheel.

In addition it will be seen that each embodiment of the invention incorporates means operative on the release of the brakes to hold the brake head in a predetermined position relative to the brake hanger, and that as the relative position of the brake head and brake hanger on an application of the brakes is changed due to wear of the brake shoe, the position in which the brake head is held by the balancing means on the release of the brakes is similarly changed.

It will be seen also that because of this automatic adjustment of the balancing means, on the subsequent adjustment of the brake rigging to remove slack therefrom, the brake shoe will not press against the wheel, while the brakes are released, but will be held substantially concentric thereof.

While several embodiments of the improved brake equipment provided by my invention have been illustrated and described in detail, it should be understood that the invention is not limited to these details of construction, and that numerous changes and modifications may be made without departing from the scope of the following claims.

Having now described my invention, what I claim as new and desire to secure by Letters Patent, is:

1. In a vehicle brake equipment, in combination, a brake hanger, a brake head pivotally carried by said brake hanger, yielding means urging said brake head to move relative to said brake hanger in one direction, a member yieldingly secured on the brake hanger, and means carried by and adjustable relative to said member for limiting movement of the brake head relative to the brake hanger.

2. In a vehicle brake equipment, in combination, a brake hanger, a brake head pivotally carried by said brake hanger, a member yieldingly secured on the brake hanger, a spring carried by said member and yieldingly urging the brake head to move in one direction relative to the brake hanger, and means carried by and adjustable relative to said member for limiting movement of the brake head relative to the brake hanger by said spring.

3. In a vehicle brake equipment, in combination, a brake hanger element, a brake head element pivotally carried by said brake hanger element, a member yieldingly carried by one of said elements for limiting movement of said brake head element relative to the brake hanger element, and a spring carried by said member for moving said brake head element relative to the brake hanger element to the position determined by said member.

4. In a brake equipment for a vehicle, in combination, a brake hanger element, a brake head element pivotally carried by said brake hanger element, a member adjustably secured on one of said elements, said member having a slot therein, the other of said elements carrying a pin extending into said slot, and a spring carried by said member and yieldingly urging said member to one end of the slot in the said member.

5. In a vehicle brake equipment, in combination, a brake hanger element, a brake head element pivotally carried by said brake hanger element, a pair of members movable relative to each other between spaced positions, yielding means urging said members to move in one direction, means to connect one of said members to one of said elements, and means to yieldingly secure the other of said members to the other of said elements.

6. In a vehicle brake equipment, in combination, a brake hanger element, a brake head element pivotally carried by said brake hanger element, a pair of members movable relative to each other between spaced positions, yielding means urging said members to move in one direction, means to connect one of said members to one of said elements, means to yieldingly secure the other of said members to the other of said elements, and means to adjustably vary the range of movement of said members relative to each other.

7. In a vehicle brake equipment, in combination, a brake hanger element, a brake head element pivotally carried by said brake hanger element, a spring associated with said elements and yieldingly urging the brake head element to move in one direction relative to the brake hanger element, a pair of members movable relative to each other between spaced points, one of said members being connected to one of said elements, the other of said members being yieldingly connected to the other of said elements, whereby said members are adapted to limit movement of the brake head element by said spring after a predetermined amount of relative movement between said elements in one direction, and whereby said members are moved relative to one of said elements after a predetermined amount of movement of said elements relative to each other in the opposite direction.

8. In a vehicle brake equipment, in combination, a brake hanger element, a brake head element pivotally carried by said hanger element, a brake shoe carried by said brake head element for engagement with a wheel of the vehicle, a member adjustably carried by one of said elements for limiting movement of said elements relative to each other in one direction, means operative on relative movement of said elements on an application of the brakes for varying the position of said member relative to the element by which it is carried, and a spring associated with said elements and operative on a release of the brakes following an application to maintain the lower end of the brake shoe in engagement with the rim of the wheel until the brake hanger element has been moved relative to the brake head element the distance permitted by said member.

9. In a vehicle brake equipment, in combination, a brake hanger element, a brake head element pivotally carried by said hanger element, a brake shoe carried by said brake head element for engagement with a wheel of the vehicle, a member adjustably carried by one of said elements for limiting movement of said elements relative to each other in one direction, means operative on relative movement of said elements on an application of the brakes for varying the position of said member relative to the element by which it is carried, and a spring carried by said member and operative on a release of the brakes following an application to maintain the lower end of the brake shoe in engagement with the rim of the wheel until the brake hanger element has been moved relative to the brake head element the distance permitted by said member.

10. In a brake equipment for a vehicle having a wheel, a brake hanger supported from the vehicle structure, a brake head pivotally secured to the brake hanger, a brake shoe carried by the brake head for engagement with said wheel, the brake hanger having a bracket associated therewith and extending beneath the point of connection of the brake head with the brake hanger, yielding means urging the lower end of said brake head to move away from said bracket, a member frictionally secured to said bracket, an element associated with said member and having limited movement relative thereto, said element and said member cooperating to limit movement of the brake head by said yielding means, said element being also operative on a predetermined movement of the brake head relative to the brake hanger against the yielding means to transmit force to move said member relative to said bracket.

11. In a brake equipment for a vehicle having a wheel, a brake hanger element supported from the vehicle structure, a brake head element pivotally carried by said brake hanger element, a brake shoe carried by said brake head element for engagement with said wheel, a member frictionally secured to one of said elements, means associated with said member and secured to the other of said elements, said means being movable relative to said member only between spaced points, and yielding means operating through said means to move the brake head element in one direction relative to said brake hanger element.

12. In a brake equipment for a vehicle having a wheel, a brake hanger element supported from the vehicle structure, a brake head element pivotally carried by said brake hanger element, a brake shoe carried by said brake head element for engagement with said wheel, yielding means urging said brake head element to move in one direction relative to said brake hanger element, a member frictionally secured to one of said elements, and means associated with said member and secured to the other of said elements, said means being movable relative to said member only between spaced points and cooperating with said member to limit movement of the brake head element by said yielding means.

13. In a brake equipment for a vehicle having a wheel, a brake hanger element supported from the vehicle structure, a brake head element pivotally carried by said brake hanger element, a brake shoe carried by said brake head element for engagement with said wheel, a member frictionally secured to one of said elements, a body associated with said member and movable relative thereto between spaced points, yielding means extending between said member and said body and operating through said body to move the brake head element relative to the brake hanger element in one direction, said body being operative upon movement of the brake head element relative to the brake hanger element against said yielding means in excess of a predetermined amount to transmit force to said member to move said member relative to the element to which it is secured.

14. In a brake equipment for a vehicle having a wheel, a brake hanger element supported from the vehicle structure, a brake head element pivotally carried by said brake hanger element, a brake shoe carried by said brake head element for engagement with said wheel, a member frictionally secured to one of said elements, a body associated with said member and movable relative thereto between spaced points, means to adjustably vary the range of movement of said body relative to said member, yielding means extending between said member and said body and operating through said body to move the brake head element relative to the brake hanger element in one direction, said body being operative on movement of the brake head element relative to the brake hanger element against said yielding means in excess of a predetermined amount to transmit force to said member to move said member relative to the element to which it is secured.

15. In a brake equipment for a vehicle having a wheel, a brake hanger element supported from the vehicle structure, a brake head element pivotally secured to said brake hanger element, a brake shoe carried by said brake head element for engagement with said wheel, a member frictionally secured to one of said elements, a body associated with said member and movable relative thereto between spaced points, said body being connected to and movable with the other of said elements, yielding means urging said brake head element to move in one direction relative to the brake hanger element, said body and said member cooperating to prevent further movement of the brake head element by the yielding means after a predetermined amount of movement thereof, said body being operative upon movement of said brake head element relative to the brake hanger element against said yielding means to transmit force to said member to move the member relative to the element to which it is secured.

16. In a brake equipment for a vehicle having a wheel, a brake hanger element supported from the vehicle structure, a brake head element pivotally secured to said brake hanger element for movement about an axis substantially parallel to the axis of the said wheel, a brake shoe carried by said brake head element for engagement with said wheel, a member frictionally secured to one of said elements and extending in a direction substantially perpendicular to the axis about which the brake head element moves, yielding means carried by said member for moving said brake head element relative to said brake hanger element in one direction, and means associated with said member for limiting movement of said brake head element by said yielding means.

17. In a brake equipment for a vehicle having a wheel, a brake hanger element supported from the vehicle structure, a brake head element pivotally secured to said brake hanger element for movement about an axis substantially parallel to the axis of said wheel, a brake shoe carried by said brake head element for engagement with said wheel, yielding means for moving said brake head element in one direction relative to the brake hanger element, a member frictionally secured to one of said elements and extending in a direction substantially perpendicular to the axis about which the brake head element moves, and means operative through said member for limiting further movement of the brake head element by said yielding means after a predetermined movement thereof by said yielding means.

EMIL G. MUELLER.